United States Patent
Shibao

(10) Patent No.: US 10,079,955 B2
(45) Date of Patent: Sep. 18, 2018

(54) IMAGE PROCESSING APPARATUS AND PRINTING APPARATUS, METHODS OF CONTROLLING THE SAME, AND STORAGE, FOR CHANGING TO TRANSMISSION SETTING SCREEN

(71) Applicant: CANON KABUSHIKI KAISHA, Tokyo (JP)

(72) Inventor: Mayumi Shibao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/061,324

(22) Filed: Mar. 4, 2016

(65) Prior Publication Data
US 2016/0301824 A1    Oct. 13, 2016

(30) Foreign Application Priority Data
Apr. 10, 2015 (JP) ................... 2015-081233

(51) Int. Cl.
G06F 3/12 (2006.01)
H04N 1/32 (2006.01)
H04N 1/00 (2006.01)

(52) U.S. Cl.
CPC ..... *H04N 1/32112* (2013.01); *H04N 1/00106* (2013.01); *H04N 1/00204* (2013.01);
(Continued)

(58) Field of Classification Search
CPC ......... H04M 1/72552; H04M 1/72563; H04W 4/12; H04W 4/16; H04W 4/18;
(Continued)

(56) References Cited

U.S. PATENT DOCUMENTS 6,023,345 A *  2/2000  Bloomfield ......... H04L 12/5835
                                                      358/402
6,606,465 B2 *  8/2003  Mutoh ................... G06K 15/00
                                                      358/400
(Continued)

FOREIGN PATENT DOCUMENTS

CN    101645999 A    2/2010
CN    103873735 A    6/2014
(Continued)

OTHER PUBLICATIONS

Chinese Office Action dated Jun. 25, 2018, in corresponding Chinese Patent Application No. 201610214910.9 (with English translation).

*Primary Examiner* — Neil R McLean
(74) *Attorney, Agent, or Firm* — Fitzpatrick, Cella, Harper & Scinto

(57) ABSTRACT

An image processing apparatus of the present invention displays a transmission setting screen for a user to set a transmission destination of image data, and when a transmission instruction is received from a user, transmits the image data to a destination set via the transmission setting screen. Meanwhile, if destination information is received from an external apparatus, a screen displayed on a display unit is changed to a transmission setting screen, and a destination designated by the received the destination information is set as a transmission destination of the image data.

21 Claims, 13 Drawing Sheets

(52) U.S. Cl.
CPC ..... *H04N 1/00212* (2013.01); *H04N 1/00236* (2013.01); *H04N 1/00411* (2013.01); *H04N 1/00413* (2013.01); *H04N 2201/0094* (2013.01)

(58) Field of Classification Search
CPC ..... H04W 4/008; H04W 4/006; H04W 4/005; H04W 88/04; H04L 67/04; H04L 67/18; H04L 67/1095; H04L 67/26; H04L 51/22; H04L 51/18; H04L 51/08; H04L 51/063; G06F 3/1454; G06F 3/1293; G06F 3/048; G06F 3/0484; H04N 1/00973; H04N 1/00204; H04N 1/00307; H04N 1/00114; H04N 1/00212; H04N 1/00222; H04N 1/22; H04N 1/00225; H04N 1/00392; H04N 1/00395; H04N 1/00352; H04N 1/00408; H04N 1/32106; H04N 1/32101; H04N 1/32122; H04N 1/00411; H04N 1/00437; H04N 1/00413; H04N 1/00472; H04N 1/00405; H04N 1/00496; H04N 1/00501
USPC ........................................ 358/1.15
See application file for complete search history.

(56) References Cited

U.S. PATENT DOCUMENTS

| | | | | |
|---|---|---|---|---|
| 6,693,729 | B1 * | 2/2004 | Bloomfield | H04L 12/5835 358/1.15 |
| 6,763,226 | B1 * | 7/2004 | McZeal, Jr. | H04B 7/18595 370/354 |
| 7,640,310 | B2 * | 12/2009 | Iida | H04N 1/00204 358/1.15 |
| 8,285,210 | B2 * | 10/2012 | Oshima | H04W 4/02 358/1.15 |
| 8,438,232 | B2 * | 5/2013 | Tsuboi | G06Q 10/107 709/206 |
| 9,025,172 | B2 * | 5/2015 | Maruyama | G06F 3/1297 358/1.15 |
| 9,026,103 | B2 * | 5/2015 | Tokumaru | H04W 12/06 455/414.1 |
| 9,191,528 | B2 * | 11/2015 | Kato | H04N 1/00217 |
| 9,311,038 | B2 * | 4/2016 | Park | G06F 3/1288 |
| 9,332,142 | B2 * | 5/2016 | Kubo | H04N 1/00506 |
| 9,467,590 | B2 * | 10/2016 | Tsujimoto | H04N 1/32112 |
| 9,497,338 | B2 | 11/2016 | Lee et al. | |
| 9,553,995 | B2 | 1/2017 | Suga et al. | |
| 2007/0253035 | A1 * | 11/2007 | Takesada | H04N 1/00395 358/468 |
| 2010/0033760 | A1 | 2/2010 | Kimura | |
| 2011/0063645 | A1 * | 3/2011 | Sugino | G06F 3/1204 358/1.13 |
| 2013/0258381 | A1 | 10/2013 | Sato | |
| 2014/0376045 | A1 * | 12/2014 | Oyoshi | H04N 1/32128 358/1.15 |
| 2015/0146242 | A1 * | 5/2015 | Tsujimoto | H04N 1/00233 358/1.15 |
| 2016/0182762 | A1 * | 6/2016 | Eum | H04N 1/4413 358/1.14 |
| 2017/0064129 | A1 | 3/2017 | Lee et al. | |

FOREIGN PATENT DOCUMENTS

| | | | |
|---|---|---|---|
| CN | 103916560 A | 7/2014 | |
| JP | 2013-243538 | 12/2013 | ............... H04N 1/00 |

* cited by examiner

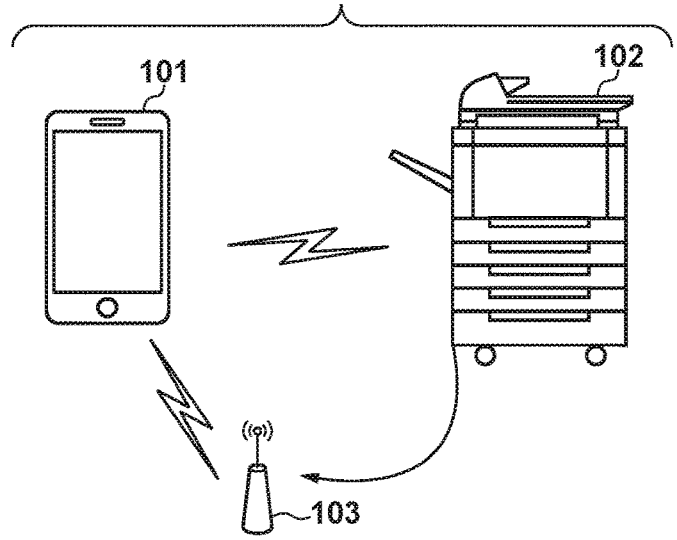
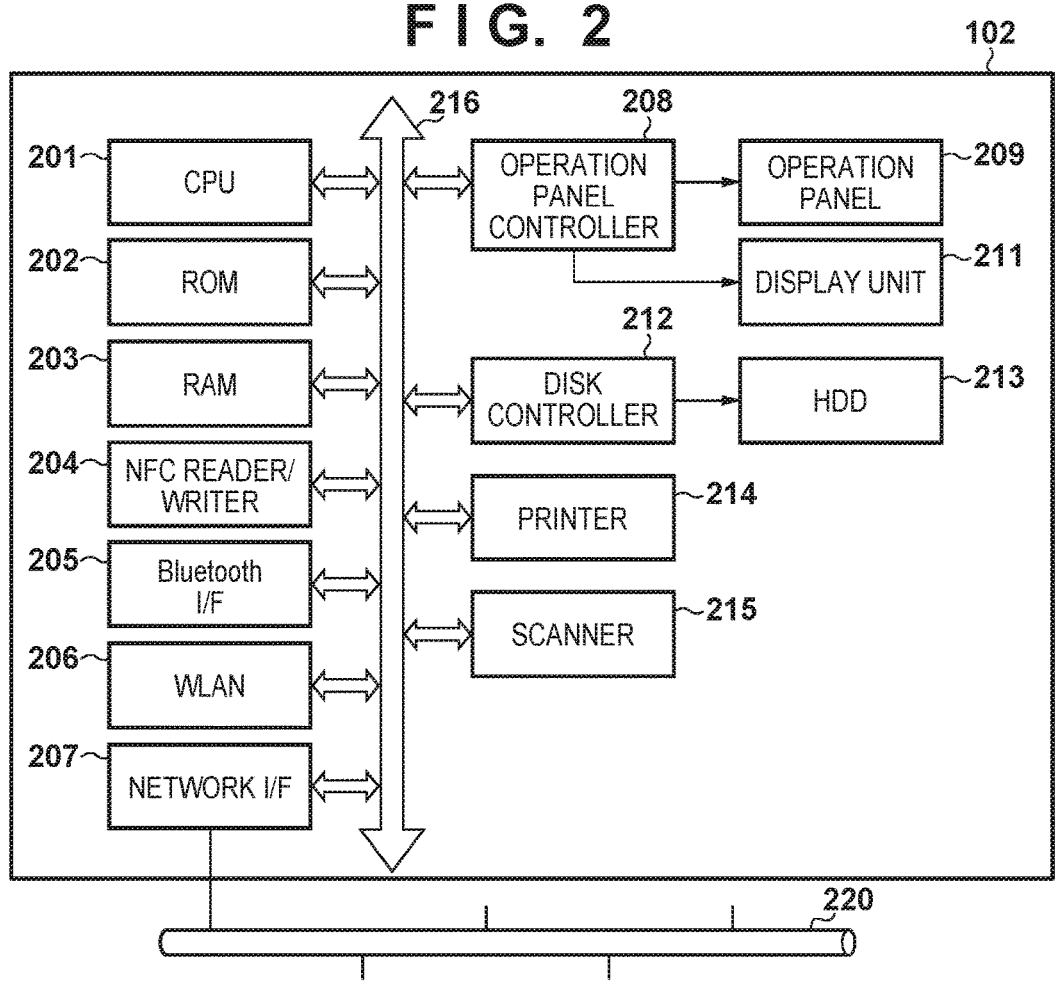

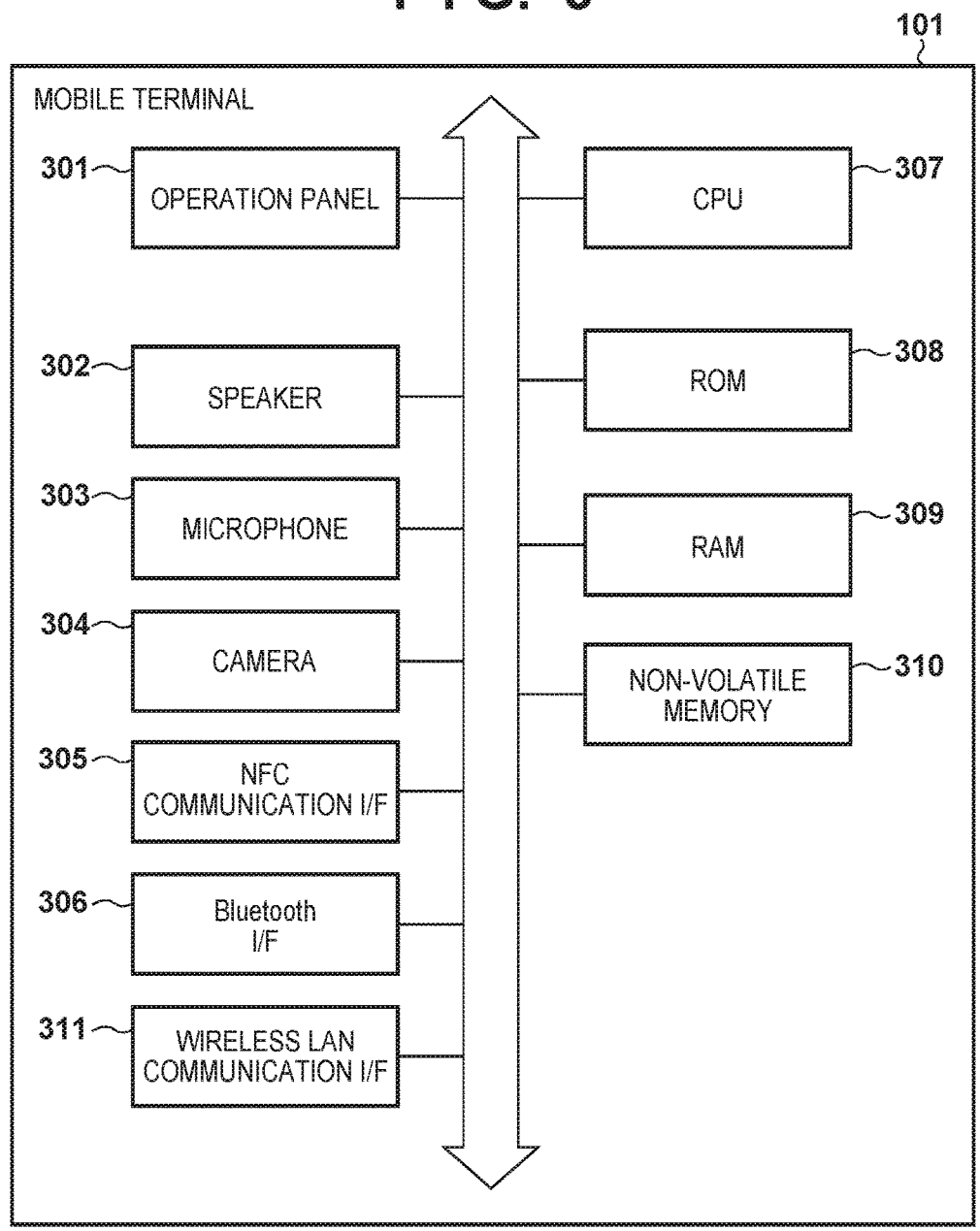

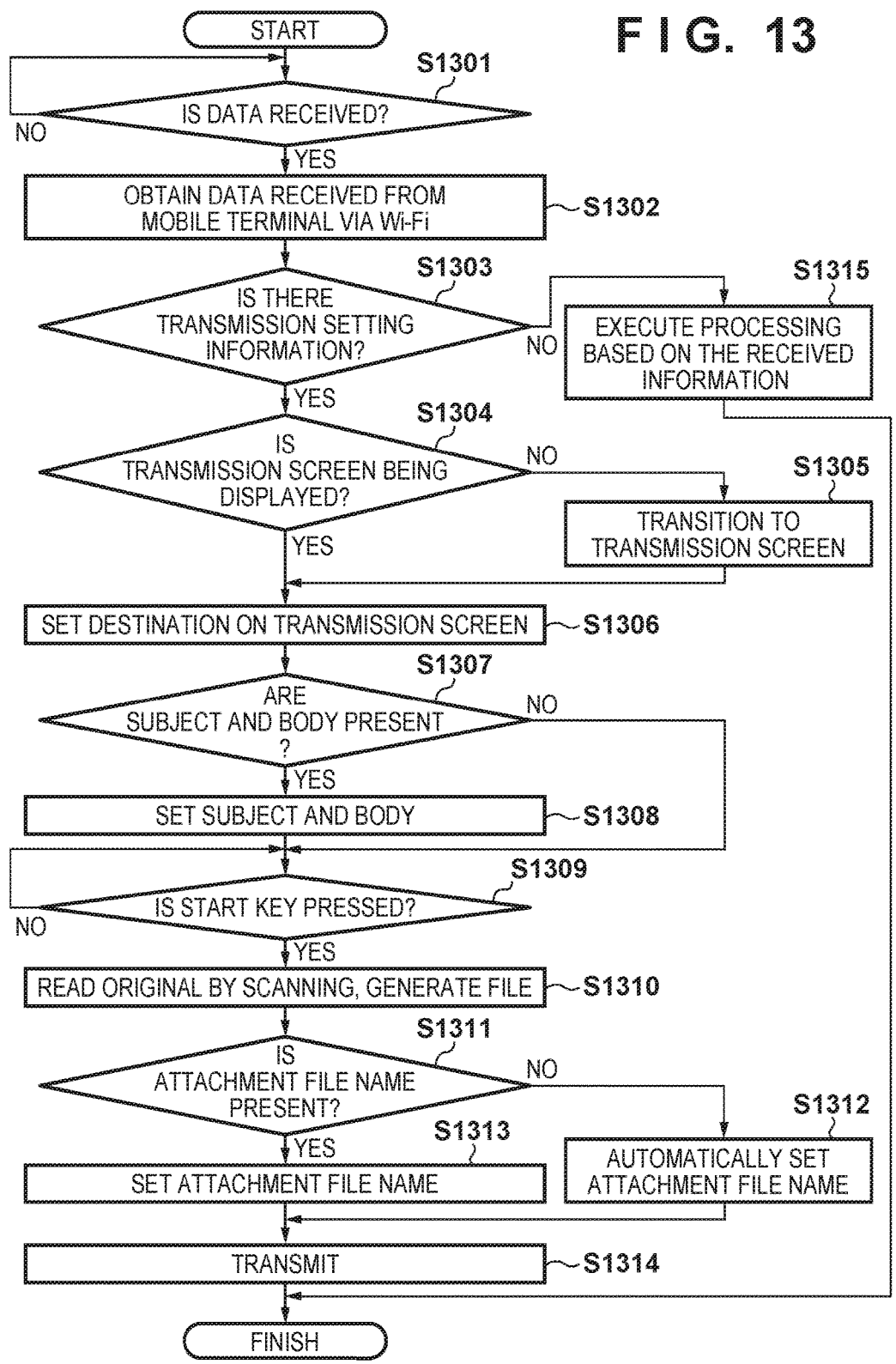

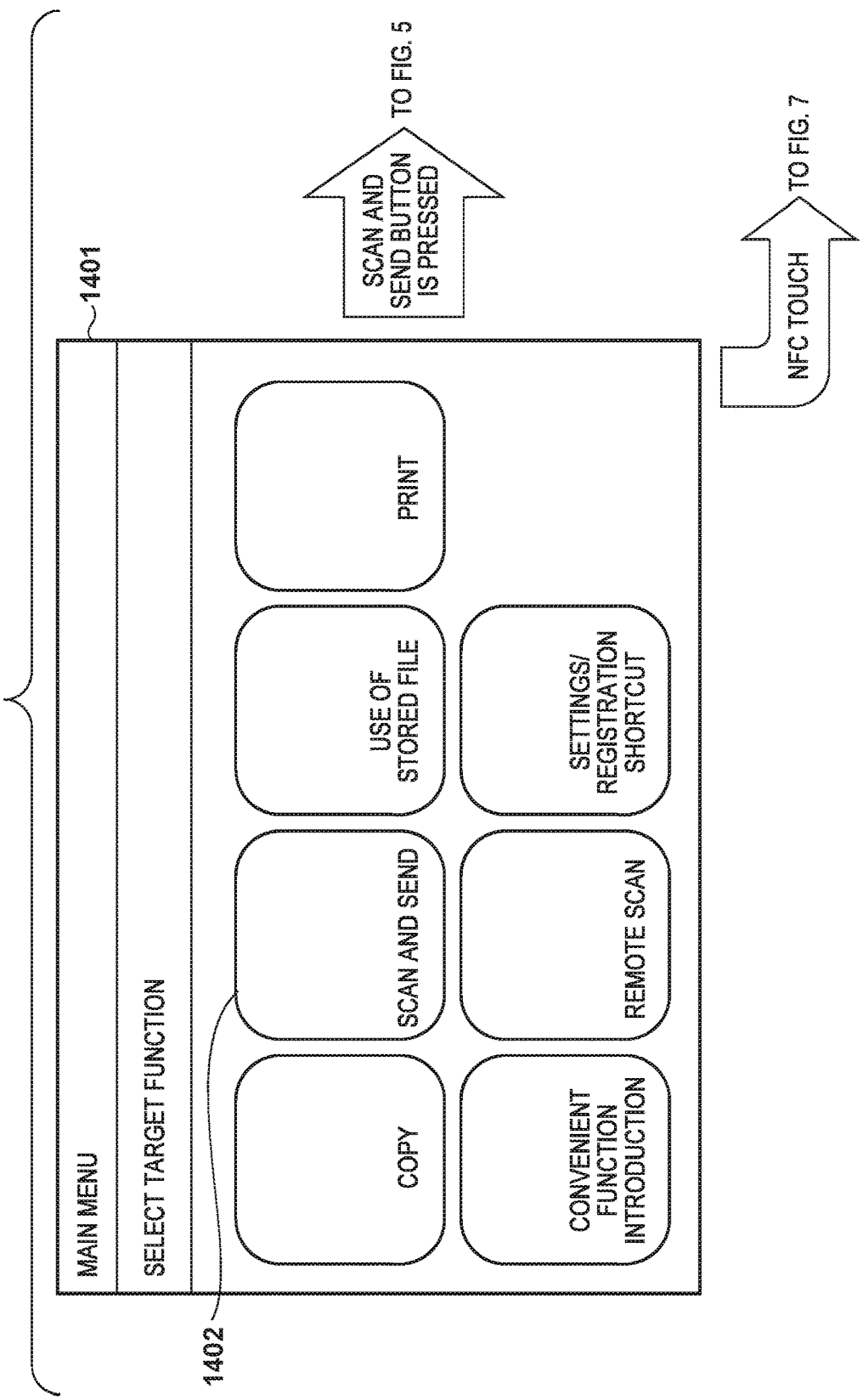

IMAGE PROCESSING APPARATUS AND PRINTING APPARATUS, METHODS OF CONTROLLING THE SAME, AND STORAGE, FOR CHANGING TO TRANSMISSION SETTING SCREEN

BACKGROUND OF THE INVENTION

Field of the Invention

The present invention relates to an image processing apparatus, a method of controlling the same, and a storage medium.

Description of the Related Art

In recent years, in conjunction with the development of multi-function peripherals (Multi-Function Peripheral) that comprise a scan function, a print function, a copy function, or the like, multi-function peripherals having a FAX transmission and reception function, and a SEND function (data transmission) for reading an original, attaching an original image to an electronic mail, and transmitting have appeared. With this SEND function, it is possible to designate, as a transmission destination, an address registered in an address book of the multi function peripheral, or a destination that a user has directly input via an operation panel.

Japanese Patent Laid-Open No. 2013-243538 discloses a technique that controls so as to not register an address corresponding to a transmission protocol for which usage is restricted, when registering a new address to an address book in a state in which transmission protocol usage is restricted for purposes of security.

Conventionally, when using the SEND function of a multi function peripheral, a user needs to designate a destination via an operation panel. Here, when transmitting to an address not registered in the address book, a destination must be input via an operation panel of the multi function peripheral, and an operation to correctly input a mail address, for example, is often a burden for a user. Therefore, because a user who is unfamiliar with the operations of a multi function peripheral requires time to designate a destination and, does not know what operation to perform in the first place, there were cases in which a user was not able to use the SEND function towards a destination that is not registered.

SUMMARY OF THE INVENTION

An aspect of the present invention is to eliminate the above-mentioned problems with conventional technology.

A feature of the present invention is to provide a technique in which, by changing a screen displayed on an image processing apparatus into a transmission setting screen and setting as a transmission destination of image data via the transmission setting screen when destination address information set by an external apparatus is received, effort of a user setting a destination by operating a console unit of an image processing apparatus can be eliminated.

The present invention in its first aspect provides an image processing apparatus for transmitting image data to a set destination, the apparatus comprising: a display unit configured to display a transmission setting screen for a user to set a transmission destination of the image data; a transmission unit configured to transmit the image data to a destination set via the transmission setting screen when a transmission instruction is received from a user; a reception unit configured to receive destination information from an external apparatus; and a control unit configured to, in a case where the reception unit receives the destination information, change a screen that the display unit displays to the transmission setting screen and set as the transmission destination of the image data a destination designated by the destination information.

The present invention in its second aspect provides a method of controlling an image processing apparatus for transmitting image data to a set destination, the method comprising: displaying a transmission setting screen on a display unit for a user to set a transmission destination of the image data; transmitting the image data to a destination set via the transmission setting screen when a transmission instruction is received from a user; receiving destination information from an external apparatus; and in a case where the destination information is received in the receiving, changing a screen that the display unit displays to the transmission setting screen and setting as the transmission destination of the image data a destination designated by the destination information.

Further features of the present invention will become apparent from the following description of exemplary embodiments with reference to the attached drawings. Note that the same reference numerals denote the same or similar components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 depicts a view illustrating an example of a communication system according to a first embodiment of the present invention.

FIG. 2 is a block diagram for explaining a hardware configuration of a multi function peripheral according to the first embodiment.

FIG. 3 is a block diagram for explaining a hardware configuration of a mobile terminal according to the first embodiment.

FIG. 13 is a flowchart for describing the process of when the multi-function peripheral according to a second embodiment receives information by wireless LAN from a mobile terminal.

FIG. 14 depicts a view for explaining a transition of a screen which is displayed on an operation panel of the multi-function peripheral according to the second embodiment.

DESCRIPTION OF THE EMBODIMENTS

Figure 4:
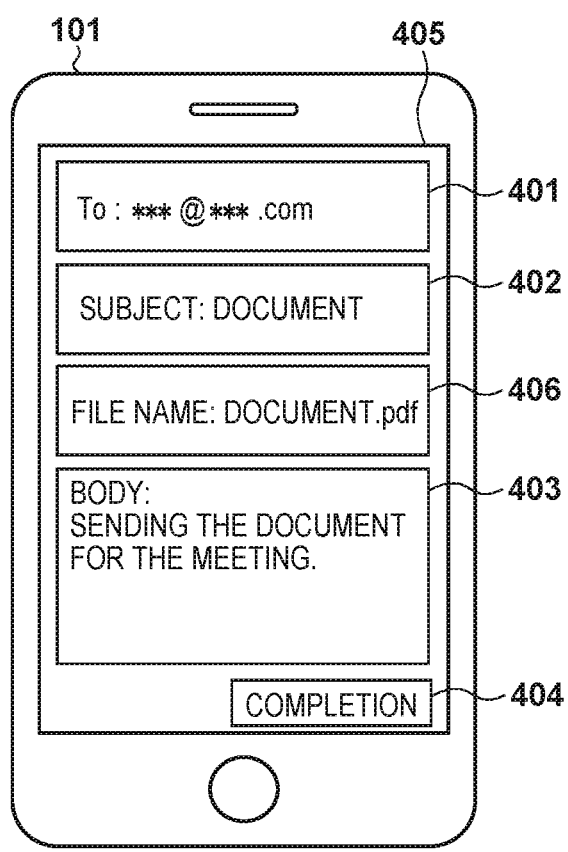
FIG. 4 depicts a view illustrating an example of a setting screen of an electronic mail transmission displayed on an operation panel of the mobile terminal according to the first embodiment.

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

[First Embodiment]

FIG. 1 depicts a view illustrating an example of a communication system according to a first embodiment of the present invention.

A mobile terminal 101 is, for example, a mobile terminal is a smartphone, a tablet or the like. A multi-function peripheral 102 is a multi-function peripheral comprising a scan function, a print function, a copy function, or the like. Here, the mobile terminal 101, the multi-function peripheral 102, and an access point 103, communication is possible through respectively corresponding communication media. In addition, the mobile terminal 101 and the multi-function peripheral 102 can communicate in an adhoc mode in which direct communication is performed without going through the access point 103, or an infrastructure mode in which communication is performed via the access point 103. The configuration illustrated in FIG. 1 is merely illustrates a common example of the configuration. For that reason, the mobile terminal used by a general user may be another information device. In addition, the multi-function peripheral 102 is not limited to a multi-function peripheral that comprises a scan function, a print function, a copy function, or the like, and may be a stand-alone device (image processing apparatus), such as a printer, a scanner or a FAX.

FIG. 2 is a block diagram for explaining a hardware configuration of the multi-function peripheral 102 according to the first embodiment.

By executing the boot program of a ROM 202, deploying into a RAM 203 a program stored in a hard disk (HDD) 213 and executing it, a CPU 201 comprehensively controls each unit connected to a system bus 216. The RAM 203 functions as a main memory, a work area, or the like of the CPU 201. In addition, the CPU 201 can transmit and receive data with various types of peripheral devices via a Bluetooth I/F 205 or a non-contact type IC card reader/writer (NFC reader/writer) 204 that uses near field wireless communication. If operating in the infrastructure mode, the wireless communication module (WLAN) 206 connects to a network 220 via the access point 103, and bidirectionally exchanges data with another network device, a file server, or the like. In addition, if operating in the adhoc mode, the multi-function peripheral 102 operates as an access point, and can perform direct wireless communication with the mobile terminal 101. The network I/F 207 exchanges data bidirectionally with another network device, a file server, or the like via the network 220. A operation panel controller 208 controls an operation panel 209, a display unit 211, various buttons comprised in the multi-function peripheral 102, or the like. A disk controller 212 controls access to the HDD 213. A printer 214 includes a printer engine of an ink-jet type or an electrophotographic printing type for example, and prints an image on a sheet in accordance with image data supplied by the CPU 201. A scanner 215 optically reads an image of an original, and generates image data corresponding to the image. In most cases, an ADF (automatic document feeder) (not shown) is attached as an option to the scanner 215, and it is possible to automatically read a plurality of originals loaded in the ADF by sequentially feeding them one sheet at a time. Note that the HDD 213 is used as a temporary storage location for image data.

FIG. 3 is a block diagram for explaining a hardware configuration of the mobile terminal 101 according to the first embodiment. Note that, for the mobile terminal 101 according to the first embodiment, an apparatus, such as a smart phone or a tablet PC, for example, is assumed, but the mobile terminal 101 may be another apparatus if it is a portable information processing apparatus.

A CPU 307 controls operations of the mobile terminal 101 by deploying a program stored in a ROM 308 or a non-volatile memory 310 into a RAM 309 and executing it. The ROM 308 stores a control program. The RAM 309 is used as a temporary storage area, such as a work area or a main memory of the CPU 307. The non-volatile memory 310 is, for example, a memory card or flash memory or the like, and stores various data such as a program, a photograph, a digital document, or the like.

An operation panel 301 has a touch panel function that can detect a touch operation of a user, and displays various screens provided by an OS or an electronic mail transmission application. The user, by inputting a touch operation in the operation panel 301, can provide a desired instruction to the mobile terminal 101. Further, the mobile terminal 101 is provided with a hardware key (not shown), and the user can input an operation instruction to the mobile terminal 101 using the hardware key.

A speaker 302 and a microphone 303 are used when the user makes a call to another mobile terminal, a fixed telephone, or the like. A camera 304 performs image capturing in accordance with a capturing instruction by a user, and image data of a photograph captured by the camera 304 is stored in a predetermined region of the non-volatile memory 310. In addition, the mobile terminal 101 can receive data from various types of peripheral devices via a near-field communication interface 305, a Bluetooth I/F 306, and a wireless LAN communication interface 311. When the near-field communication interface 305 is approached by an NFC tag, it can obtain information stored in that the NFC tag, and write information to the NFC tag. The wireless LAN communication interface 311 can communicate in the infrastructure mode or the adhoc mode, which are described above.

FIG. 4 depicts a view illustrating an example of a setting screen of an electronic mail transmission displayed on the operation panel 301 of the mobile terminal 101 according to the first embodiment.

A user inputs information necessary for transmission of an electronic mail via the setting screen 405 of an electronic mail transmission 405. An address field 401 indicates a mail address of a transmission destination, and the mail address can be input by selecting an address from an address book stored in the mobile terminal 101. Furthermore, the user, using a soft keyboard of the mobile terminal 101, can input any character string into the address field 401, a subject field 402, and a body field 403. For these fields, in addition to using the soft keyboard, voice recognition or the like may also be used for input. An attachment type field 406 is used to specify the file to attach to the electronic mail. After these inputs have been completed, the user presses a completion button 404 and the electronic mail transmission setting is completed.

Next, explanation is given of a user interface in the multi-function peripheral 102 according to the first embodiment.

Figure 5:
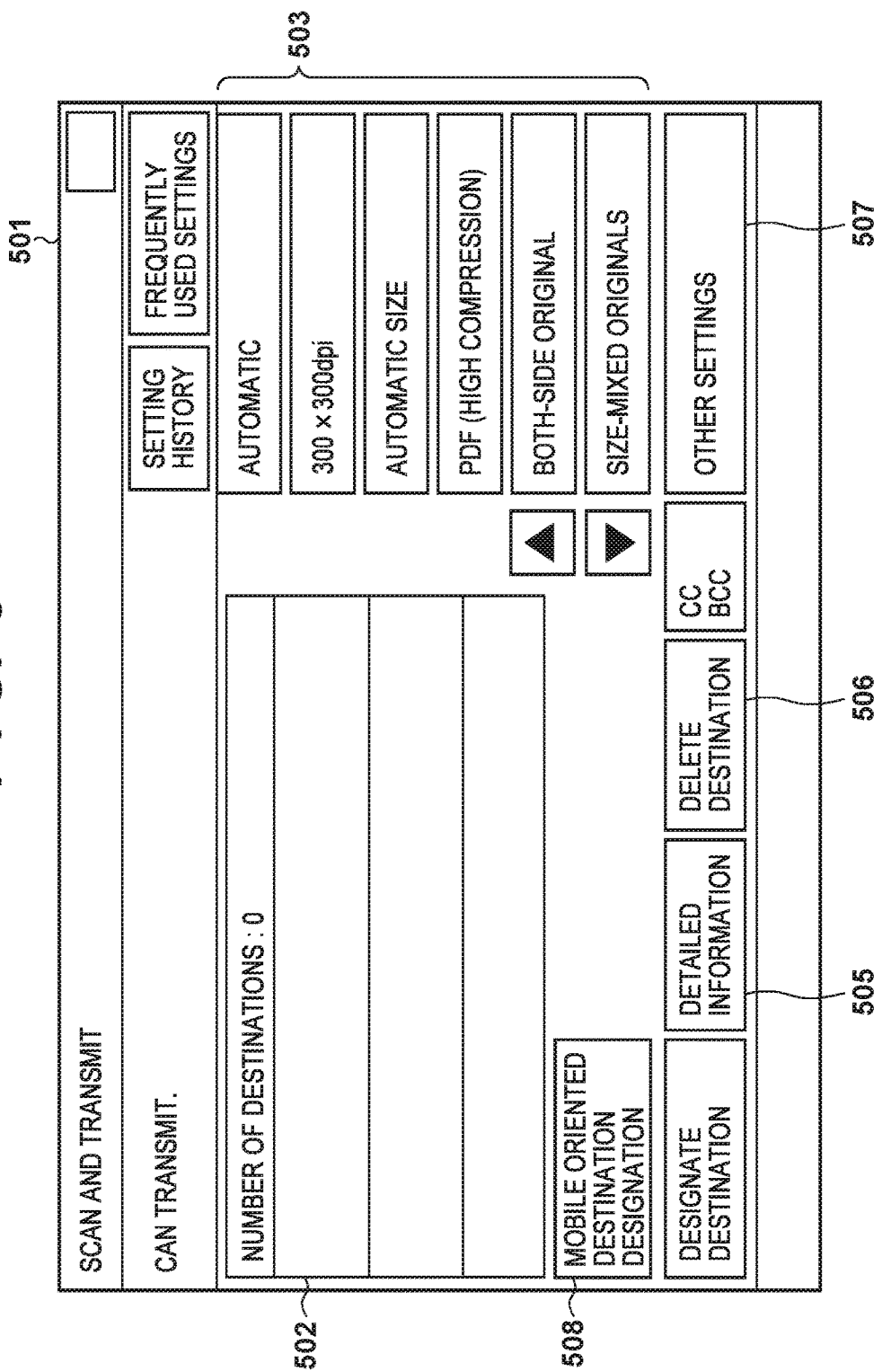
FIG. 5 depicts a view illustrating an example of a scan and transmit setting screen which is displayed on an operation panel of the multi-function peripheral according to the first embodiment.

FIG. 5 depicts a view illustrating an example of a scan and transmit setting screen which is displayed on the operation panel 209 of the multi-function peripheral 102 according to the first embodiment.

A transmission setting screen 501 of FIG. 5 is a screen for performing destination and scanning settings. A destination list 502 displays in a list destinations set as transmission destinations. A destination is an address for an electronic mail, a FAX, a server, or the like. FIG. 5 illustrates a state in which transmission destinations are not yet set for the destination list 502. Scan setting buttons 503 shows scan settings set at that point in time, and a user can change the scan settings via this screen. When a detailed information button 505 is pressed, transition is made to a screen that displays detailed information of a destination selected in the destination list 502. When a destination delete button 506 is pressed, a destination selected in the destination list 502 is deleted. When an other settings button 507 is pressed, a screen (not shown) for a menu list for changing transmission content is displayed, and when a subject/body is designated from the menu list, transition is made to a scan and transmit subject/body input screen 801 illustrated in FIG. 8.

Figure 8:
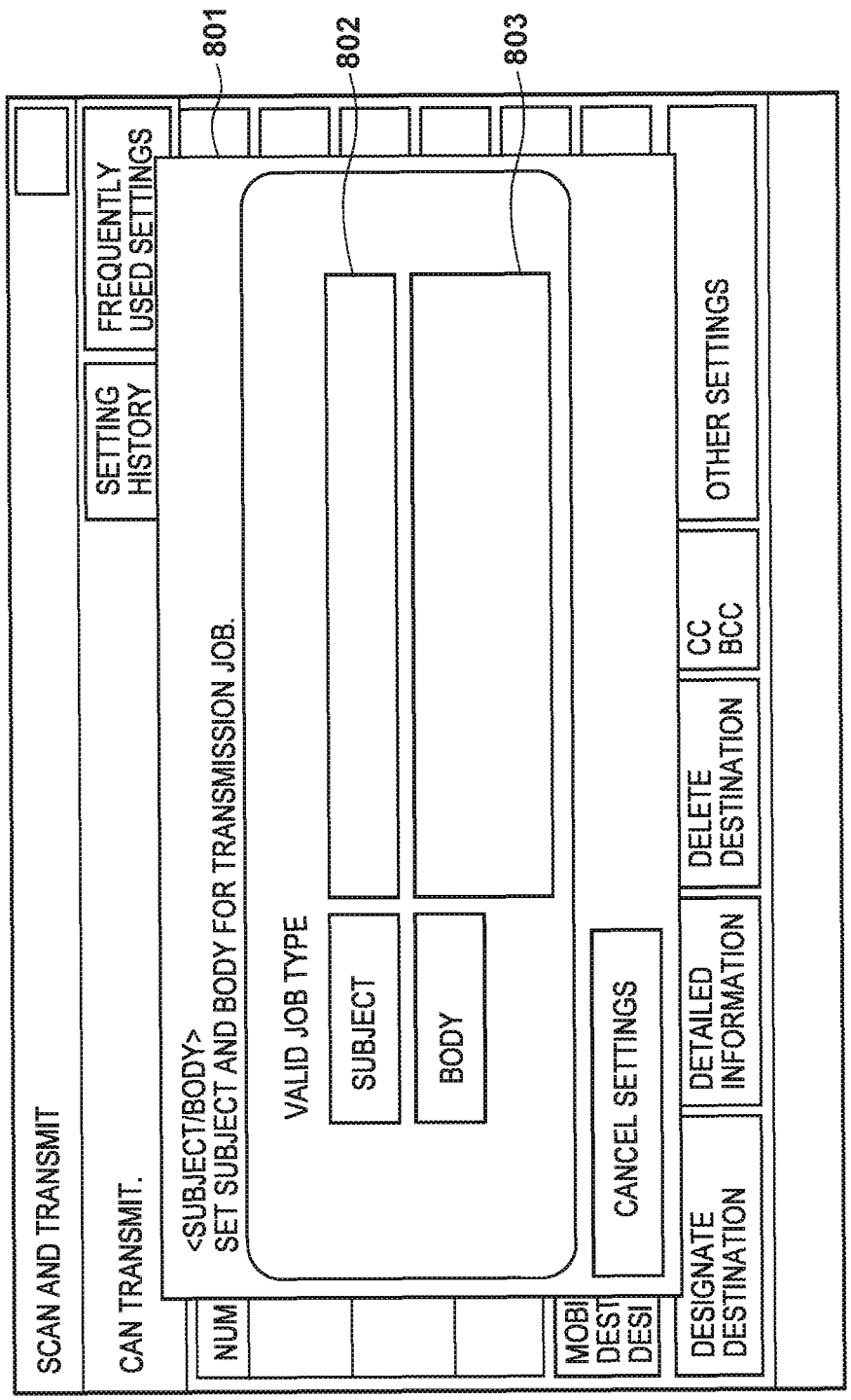
FIG. 8 depicts a view illustrating an example of a scan and transmit subject/body input screen displayed on the operation panel of the multi-function peripheral according to the first embodiment.

FIG. 8 depicts a view illustrating an example of a "scan and transmit" subject/body input screen 801 which is displayed on the operation panel 209 of the multi-function peripheral 102 according to the first embodiment.

Here, a subject field 802 to input a subject of a scan and transmit job and a body field 803 to input a body that is a comment attached to the job are displayed, and a user can use a soft keyboard displayed on the operation panel 209 to input character strings in these fields.

Figure 6:
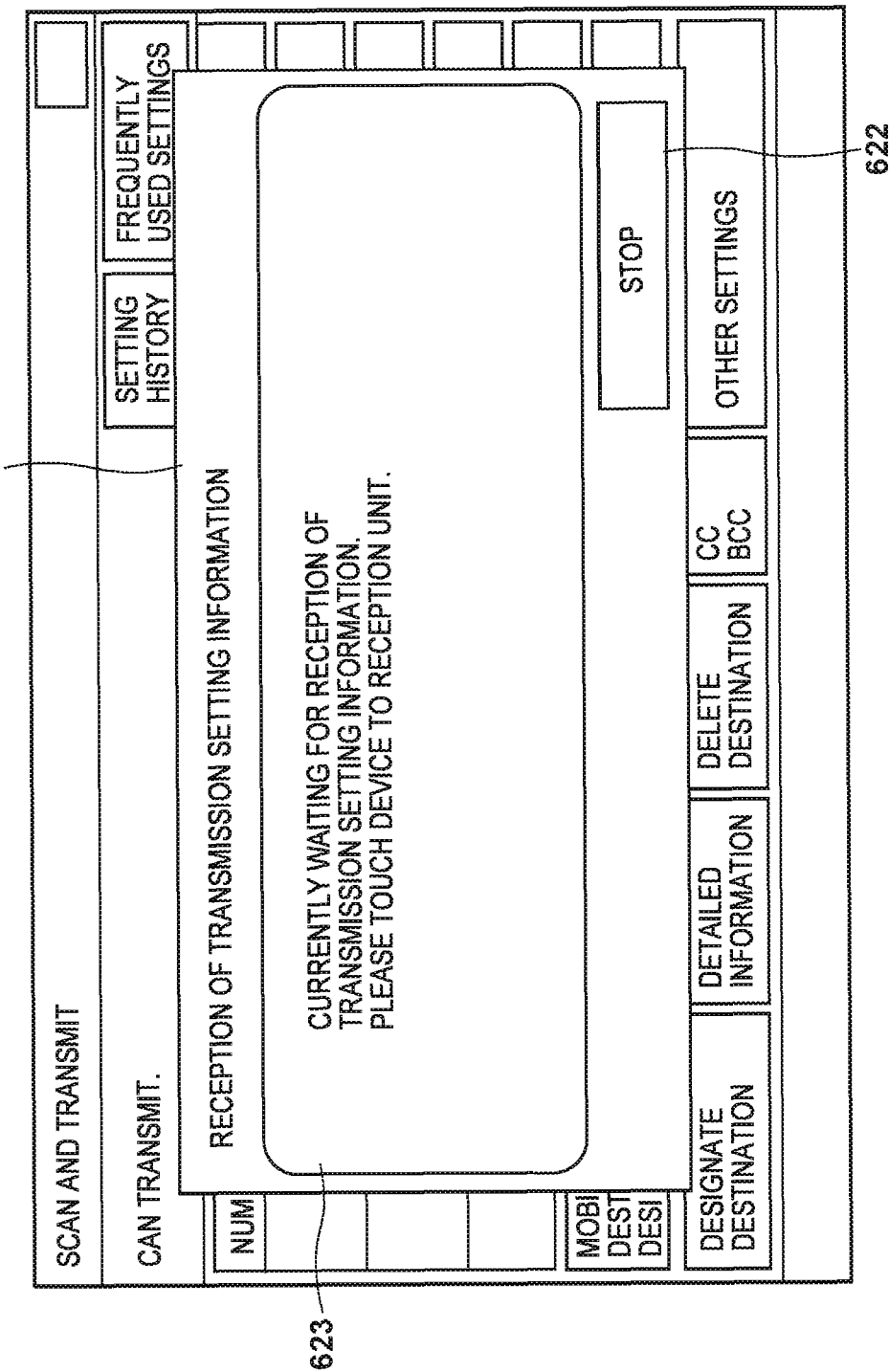
FIG. 6 depicts a view illustrating an example of a screen for receiving scan and transmit setting information and which is displayed on the operation panel of the multi-function peripheral according to the first embodiment.

In addition, when a mobile oriented destination designation button 508 of the setting screen 501 of FIG. 5 is pressed, transition is made to a reception screen 621, illustrated in FIG. 6, for receiving "scan and transmit" setting information, and a state of waiting for reception of a wireless LAN connection from the mobile terminal 101 is entered.

FIG. 6 depicts a view illustrating an example of a reception screen 621 of "scan and transmit" setting information which is displayed on the operation panel 209 of the multi-function peripheral 102 according to the first embodiment.

A message that instructs so as to touch a user's mobile terminal 101 to the NFC reader/writer 204 (NFC tag) of the multi-function peripheral 102 is displayed on a user message 623. Here, when a user presses a stop button 622, the state of waiting for reception is interrupted, and the scan and transmit setting screen (FIG. 5) is returned to.

Figure 7:
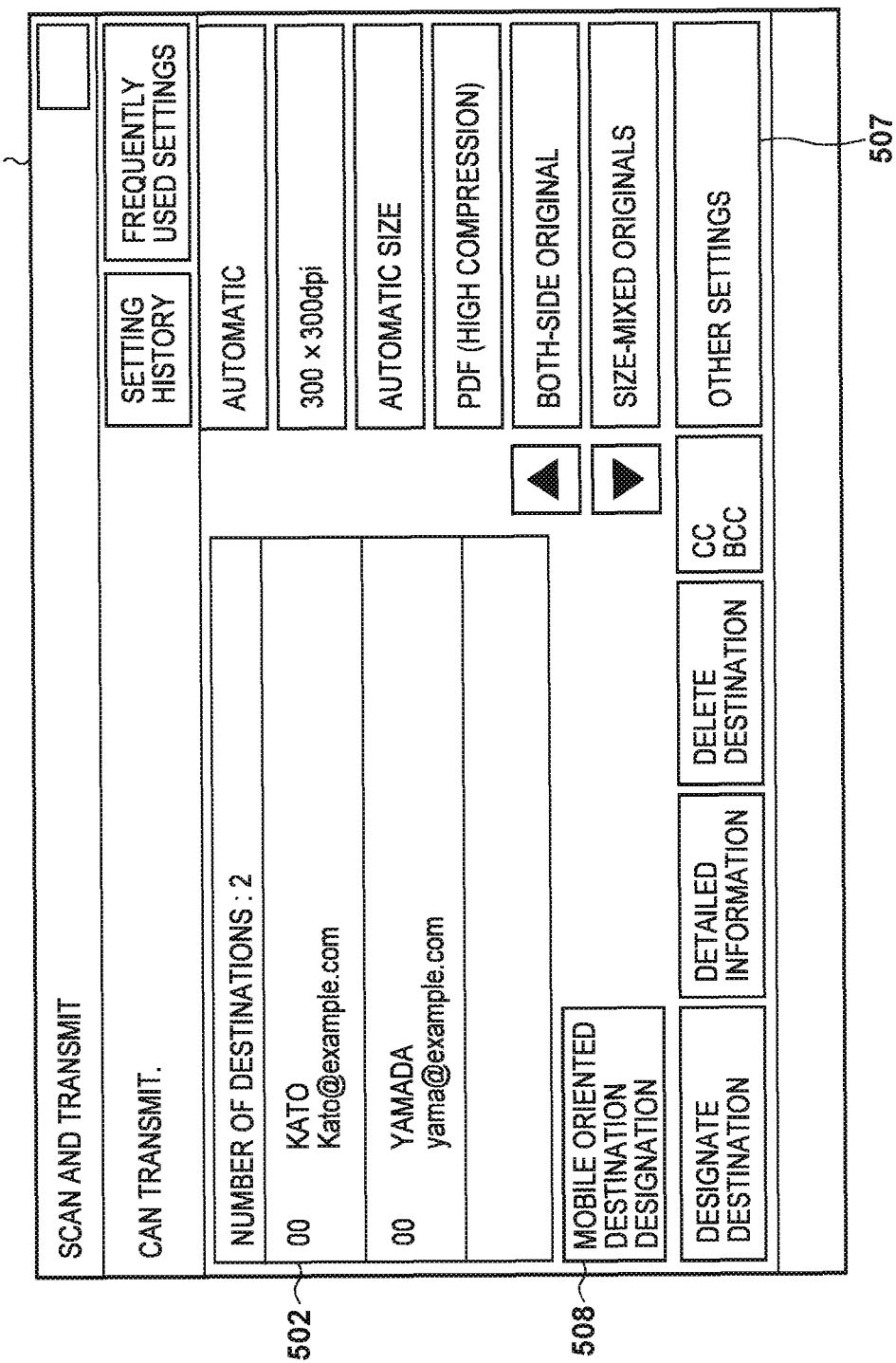
FIG. 7 depicts a view illustrating an example of a transmission setting screen displayed on the operation panel when the multi function peripheral according to the first embodiment receives electronic mail transmission setting information.
Figure 9:
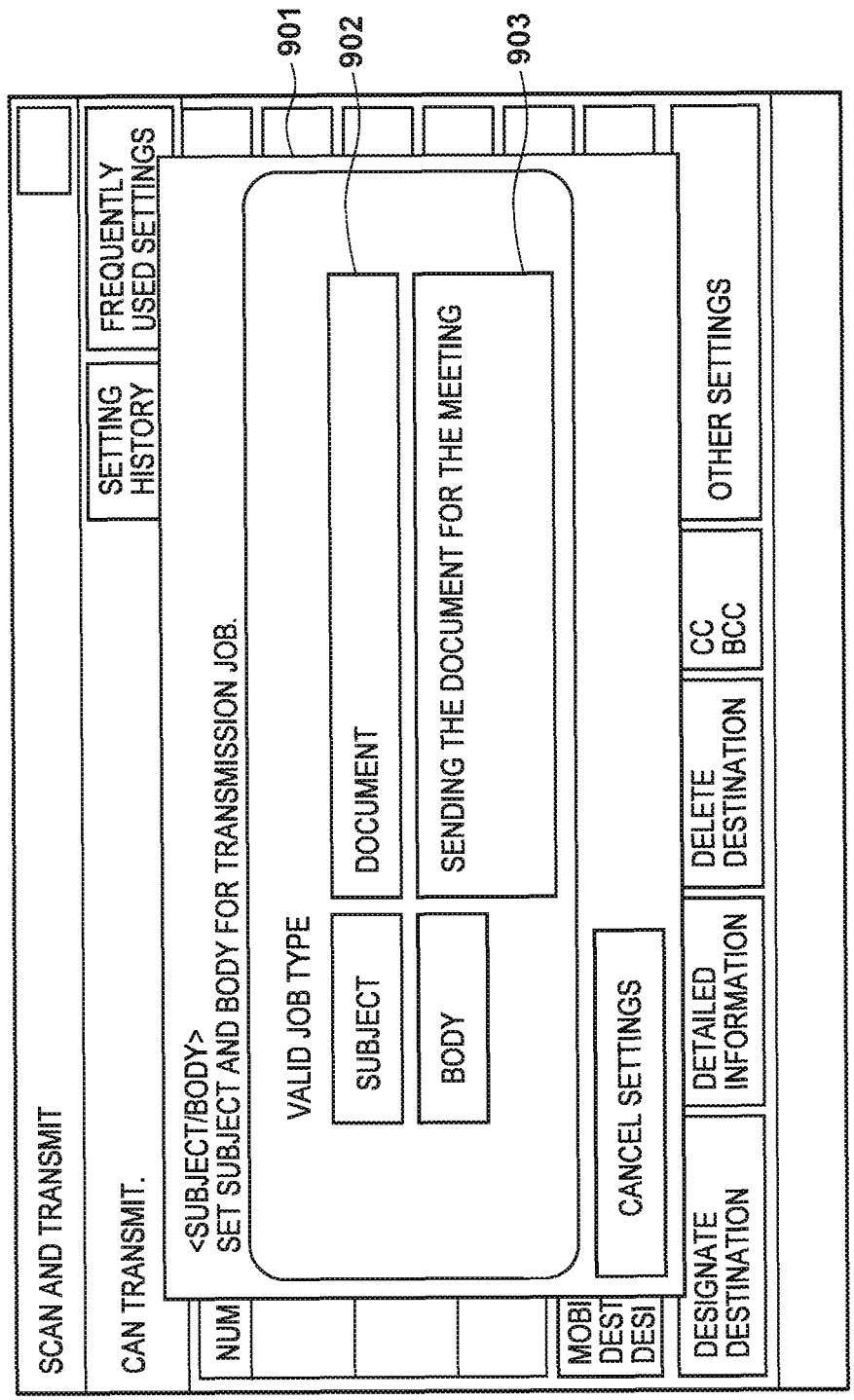
FIG. 9 depicts a view illustrating an example of a scan and transmit subject/body setting screen displayed on the operation panel of the multi-function peripheral according to the first embodiment.

Next, explanation is given with reference to FIG. 7 and FIG. 9 of screens that the multi-function peripheral 102 according to the first embodiment displays after receiving electronic mail information from the mobile terminal 101 by wireless LAN.

Here the mobile terminal 101, for example in a state in which the electronic mail transmission setting screen illustrated in FIG. 4 is displayed, is touched to the NFC reader/writer 204 of the multi-function peripheral 102. With this, the multi-function peripheral 102 and the mobile terminal 101 start wireless LAN communication. Instead of NFC, a two-dimensional code or connection information received via Bluetooth, for example, may be used for establishment of wireless LAN communication. Immediately after starting the wireless LAN communication, the multi-function peripheral 102 receives electronic mail transmission setting information from the mobile terminal 101.

FIG. 7 depicts a view illustrating an example of a transmission setting screen displayed on the operation panel 209 when the multi-function peripheral 102 according to the first embodiment receives electronic mail transmission setting information. In FIG. 7, portions in common with FIG. 5 are illustrated with the same reference numerals.

Here, obtained electronic mail addresses are displayed in the destination list 502, and two destinations are displayed here. Here, when the other settings button 507 is pressed and a subject/body from the menu list (not shown) is pressed, the "scan and transmit" subject/body setting screen 901, illustrated in FIG. 9, is displayed. At this point, from among the electronic mail transmission setting information received from the mobile terminal 101, a subject is displayed in a subject field 902, and a body is displayed in a body field 903.

FIG. 9 depicts a view illustrating an example of a scan and transmit subject/body setting screen 901 which is displayed on the operation panel 209 of the multi-function peripheral 102 according to the first embodiment.

There are cases in which electronic mail information is received from the mobile terminal 101 by a touch to the NFC reader/writer 204 described above in a state in which a transmission setting (for example a setting of an address) is being made using the operation panel 209 in the transmission setting screen of the multi-function peripheral 102. In such a case, for example, a transmission setting information duplication screen 1031 illustrated in FIG. 10 is displayed.

Figure 10:
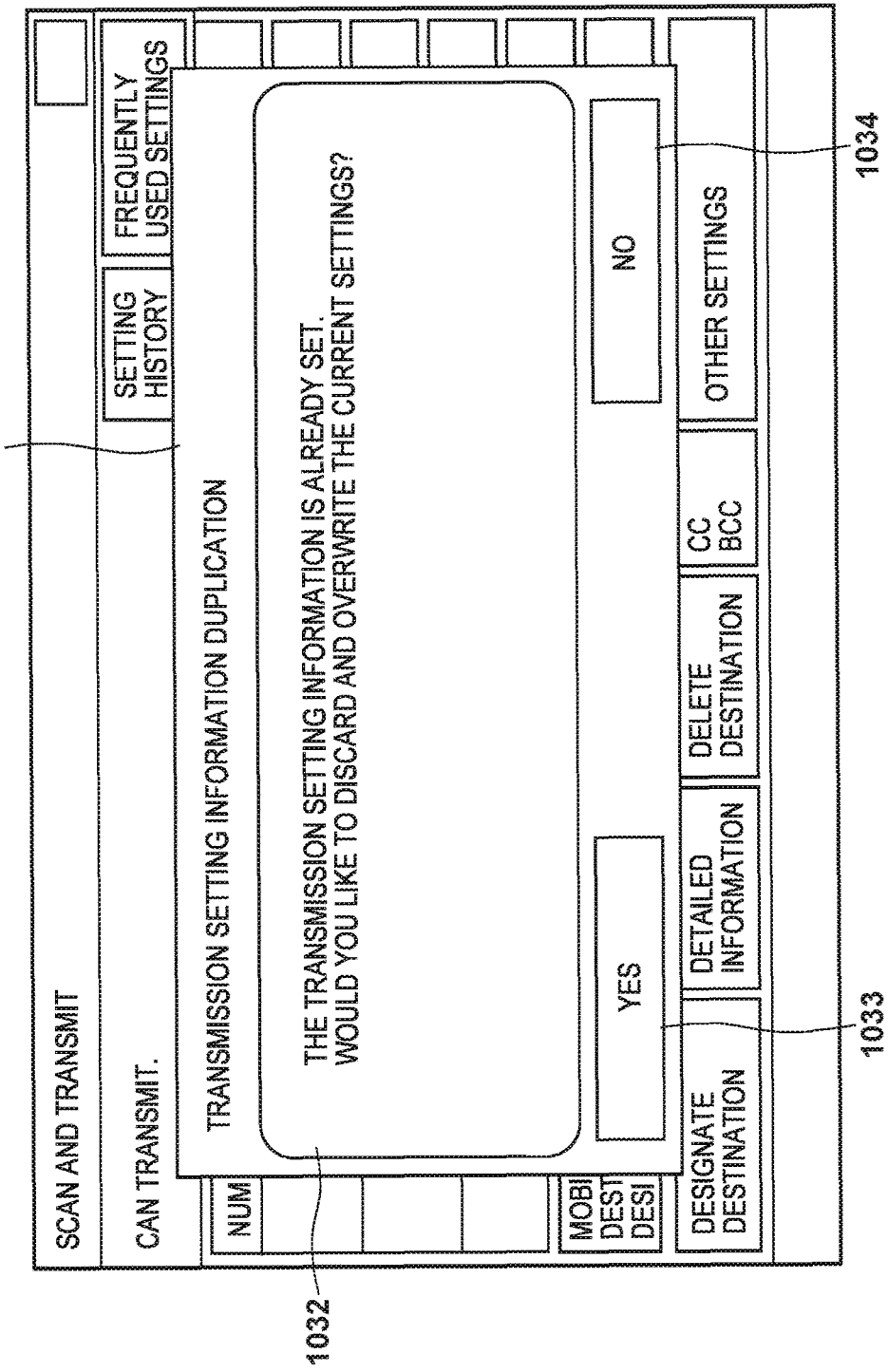
FIG. 10 depicts a view illustrating an example of a transmission setting information duplication screen which is displayed on the operation panel of the multi-function peripheral according to the first embodiment.

FIG. 10 depicts a view illustrating an example of a transmission setting information duplication screen 1031 which is displayed on the operation panel 209 of the multi-function peripheral 102 according to the first embodiment.

A user message 1032 displays an instruction to determine whether to reflect the electronic mail transmission setting information received from the mobile terminal 101. Here, when a YES button 1033 is pressed, information set in the transmission screen is discarded, and electronic mail transmission information received from the mobile terminal 101 is set in the transmission screen. However, when a NO button 1034 is pressed, the electronic mail transmission information received from the mobile terminal 101 is discarded.

Figure 11:
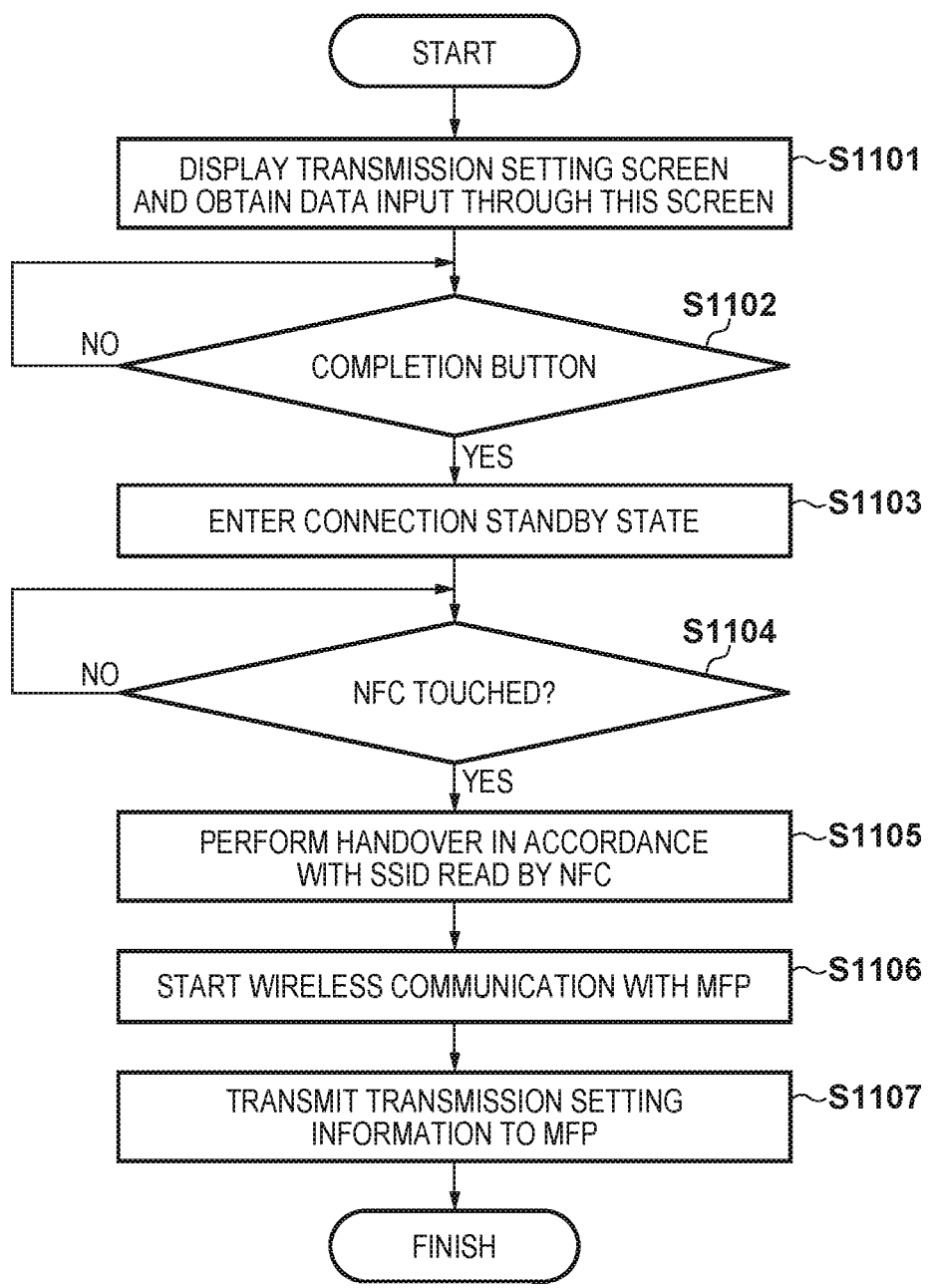
FIG. 11 is a flowchart for describing a process of the mobile terminal 101 for performing transmission setting of an electronic mail by communicating with the multi function peripheral using information that the mobile terminal according to the first embodiment read by an NFC communication.

Next, explanation is given with reference to FIG. 11 of a flow of processing for inputting electronic mail transmission information and transmitting to the multi-function peripheral 102 in the mobile terminal 101 according to the first embodiment.

FIG. 11 is a flowchart for describing a process of the mobile terminal 101 for performing transmission setting of an electronic mail by communicating with the multi-function peripheral 102 using information that the mobile terminal 101 according to the first embodiment read by an NFC communication. Note that a program that executes this processing is stored in the ROM 308, and by the CPU 307 executing that program, the process described by this flowchart is realized.

Firstly in step S1101, the CPU 307 displays the transmission setting screen that is illustrated in FIG. 4 for example on the operation panel 301, here when a user inputs transmission setting information, such as by selecting a destination from an address book, via this screen, the CPU 307 obtains the transmission setting information. The transmission setting information includes data such as a subject, a body, a destination address, or the like.

Next, the processing proceeds to step S1102, and the CPU 307 waits for the completion button 404 to be pressed on this screen. When the completion button 404 is pressed, the processing proceeds to step S1103, and the CPU 307 makes the mobile terminal 101 enter an NFC transmission standby waiting state. At this point, the multi-function peripheral 102 has generated an SSID by operating in the infrastructure mode, and has stored the SSID and a password in the NFC reader/writer 204.

Next the processing proceeds to step S1104 and the CPU 307 waits for detection of a touch to the NFC reader/writer 204 of the multi-function peripheral 102. When the CPU 307 detects a touch to the NFC reader/writer 204, the processing proceeds to step S1105, and the CPU 307 obtains the SSID from the NFC reader/writer 204 to execute a handover. The processing proceeds to step S1106, and the CPU 307 uses the connection information read by the NFC to start wireless LAN communication with the multi-function peripheral 102. Next, the processing proceeds to step S1107 and the CPU 307 transmits the transmission setting information obtained in step S1101 to the multi-function peripheral 102, and this processing terminates.

As explained above, by virtue of the mobile terminal 101 according to the first embodiment, it is possible to set electronic mail transmission information in the multi-function peripheral by transmitting the transmission setting information set in the mobile terminal 101 to the multi-function peripheral. With this, a user who wishes to use the multi function peripheral does not need to input a destination or the like from the operation panel of the multi function peripheral, and even a user who has not been guided in operation of the multi function peripheral can easily set transmission setting information in the multi function peripheral.

Figure 12:
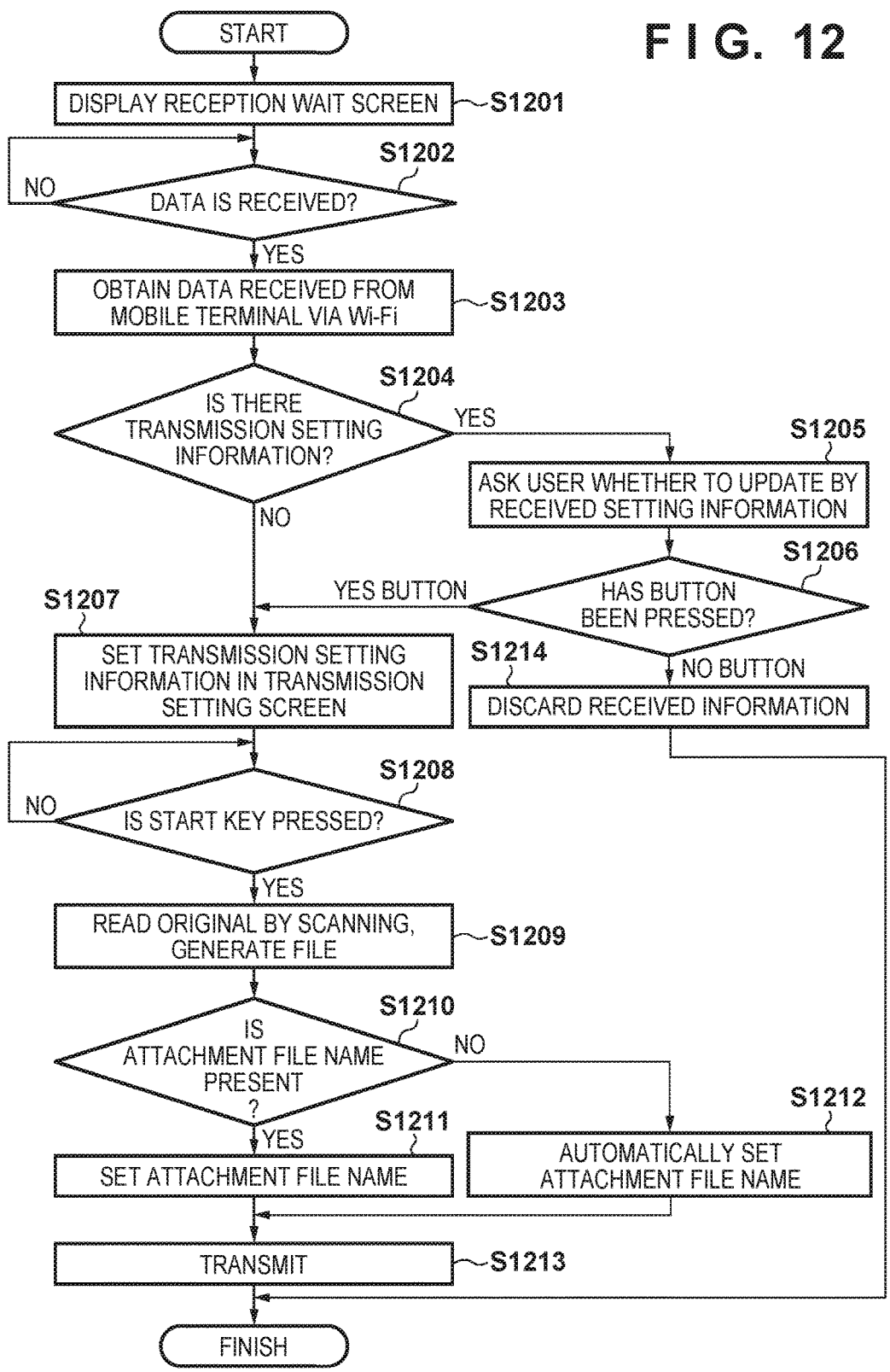
FIG. 12 is a flowchart for describing a process for when the multi-function peripheral according to the first embodiment receives transmission setting information from the mobile terminal.

FIG. 12 is a flowchart for describing a process for when the multi-function peripheral 102 according to the first embodiment receives transmission setting information from the mobile terminal 101. Note that a program that executes this processing is stored in the HDD 213, and at a time of execution, by the CPU 201 deploying the program into the RAM 203 and executing it, processing described by the flowchart is realized.

In step S1201, the CPU 201 waits, in a state in which the screen 621 as shown in FIG. 6 for waiting transmission setting information is displayed, to receive electronic mail transmission setting information from the mobile terminal 101 via the wireless LAN. In step S1202, when there is a reception from the mobile terminal 101 via the wireless LAN, the processing advances to step S1203. In step S1203, the CPU 201 obtains data received from the mobile terminal 101 via the wireless LAN. Next the processing proceeds to step S1204, and the CPU 201 determines whether or not the received data includes the transmission setting information set by the mobile terminal 101. Here, if the transmission setting information is not included, the processing proceeds to step S1207, but if the transmission setting information is included, the processing proceeds to step S1205.

In step S1205, the CPU 201 displays a screen illustrated in previously described FIG. 10 for example, and queries a user as to whether or not to update with the transmission setting information received from the mobile terminal 101. The processing proceeds to step S1206, and whether an operation by a user is performed in this screen is determined. If the YES button 1033 has been pressed, the processing proceeds to step S1207, and if the NO button 1034 has been pressed, the processing proceeds to step S1214. In step S1207, the CPU 201 sets the destination, the subject, and the body in the transmission screen as shown in FIG. 9, and the processing proceeds to step S1208. Meanwhile in step S1214, the CPU 201 discards the transmission setting information of the electronic mail received from the mobile terminal 101, and this processing terminates.

In step S1208, the CPU 201 waits for a user to press a start key (not shown) of the operation panel 209, and if the start key is pressed, the processing proceeds to step S1209. In step S1209, the CPU 201 executes reading of an original by the scanner 215, and generates a file of the read data. Next the processing proceeds to step S1210, and the CPU 201 determines whether or not there is an attachment file name in the transmission setting information. If it is determined that there is the attachment file name, the processing proceeds to step S1211, the attachment file name is set to a name of the file obtained by scanning, and the processing proceeds to step S1213. Meanwhile if the CPU 201 determines in step S1210 that there is no attachment file name in the transmission setting information, the processing proceeds to step S1212, an attachment file name is automatically set for the file obtained by scanning, and the file is attached, then the processing proceeds to step S1213. In step S1213, the CPU 201 transmits an electronic mail with the attachment file to the address set in the transmission destination.

As explained above, by virtue of the multi-function peripheral 102 according to the first embodiment, it is possible to receive from the mobile terminal 101 and set as transmission setting information of the multi-function peripheral 102 a destination, a subject, body data, an attachment file name, or the like input by the mobile terminal 101. With this, a user can easily transmit data to a designated destination without performing a cumbersome operation of operating the operation panel 209 of the multi-function peripheral 102 to input a destination, a body, or the like.

[Second Embodiment]

In the first embodiment above, explanation was given of an example in which, when the multi-function peripheral 102 is connected to the mobile terminal 101 by wireless LAN in a state in which the multi-function peripheral 102 displays a screen for receiving a transmission setting information, the multi-function peripheral 102 receives transmission setting information from the mobile terminal 101, and sets the information as the transmission setting information of the multi-function peripheral 102. However, even if the multi-function peripheral 102 is not displaying the screen, the multi-function peripheral 102 may receive electronic mail transmission setting information from the mobile terminal 101. Accordingly, explanation is given regarding that case in the second embodiment. Note that, because a configuration of a communication system according to the second embodiment and hardware configurations of the mobile terminal 101 and the multi-function peripheral 102 are the same as those in the case of the previously described first embodiment, explanation thereof is omitted.

FIG. 13 is a flowchart for describing a process for when the multi-function peripheral 102 according to the second embodiment receives information from the mobile terminal 101 by wireless LAN. Note that a program that executes this processing is stored in the HDD 213, and at a time of execution, by the CPU 201 deploying the program into the RAM 203 and executing it, processing described by this flowchart is realized.

Prior to the processing, the mobile terminal 101 has started a wireless LAN connection by the connection information received via the NFC. In step S1301, the CPU 201 waits to receive information from the mobile terminal 101. In step S1301, upon receiving information, the processing proceeds to step S1302, and the CPU 201 obtains information that is received from the mobile terminal 101 via the wireless LAN. Next the processing proceeds to step S1303, and the CPU 201 determines whether or not the received information is electronic mail transmission setting information. Here, in the case of electronic mail transmission setting information the processing proceeds to step S1304, and it is determined whether or not a screen displayed in the operation panel 209 is a transmission screen, but if it is determined that there is no transmission setting information in step S1303, the processing proceeds to step S1315.

If the CPU 201 determined in step S1304 that the transmission screen is being displayed, the processing proceeds to step S1306, but if it determined that the transmission screen is not being displayed, the processing proceeds to step S1305. In step S1305, in a case where a main menu 1401 as shown in FIG. 14, for example, is being displayed, when, by a touch to the NFC reader/writer 204 with the mobile terminal 101, a handover is performed between the multi-function peripheral 102 and the mobile terminal 101 and transmission information is received from the mobile terminal 101, an automatic transition is made to a transmission screen as shown in FIG. 7, and the processing proceeds to step S1306.

FIG. 14 depicts a view for explaining a transition of a screen which is displayed on the operation panel 209 of the multi-function peripheral 102 according to the second embodiment.

A transmission screen as shown in FIG. 5 is a screen displayed when a scan and send button 1402 on the main menu is pressed. The transmission screen indicates an example of a screen automatically displayed when transmission setting information is received from the mobile terminal 101, in accordance with the mobile terminal 101 being touched to the NFC reader/writer 204 of the multi-function peripheral 102.

In step S1306 the CPU 201 sets, and displays, in the destination list of the transmission screen, for example, as shown in FIG. 7, an electronic mail address set in the received electronic mail transmission setting information. Next the processing proceeds to step S1307, the CPU 201 determines whether or not a subject and a body exist in the received electronic mail transmission setting information. If it is determined that the subject and body exist, the processing proceeds to step S1308, the CPU 201 holds the subject and the body included in the transmission setting information as electronic mail transmission setting information, and the processing proceeds to step S1309. In step S1309, the CPU 201 determines whether or not a start key (not shown) of the operation panel 209 is pressed. When the start key is pressed, the processing proceeds to step S1310. In step S1310, the CPU 201, similarly to in step S1209 of FIG. 12, executes scan processing that scans an original by the scanner 215. A file of image data obtained by the scanning is then generated. Similarly to in step S1210 through step S1213 of FIG. 12, in step S1311 through step S1314, a file name of the file is set, and by attaching the file, transmission as an electronic mail to the address set in the transmission destination is performed.

In addition, if the information received from the mobile terminal 101 is not electronic mail transmission setting information in step S1303, the processing proceeds to step S1315, and processing based on the received information is executed. For example, if the information obtained in step S1302 is printing data, printing is executed in step S1315.

By the second embodiment, as explained above, it is possible to easily set transmission information or a destination of an electronic mail and then transmit the electronic mail, without a cumbersome operation of inputting an address or a body using the operation panel 209 of the multi-function peripheral 102.

Furthermore, by instructing a start of wireless communication by a two dimensional code or NFC, it is possible to improve security because it is guaranteed that a user is in front of the multi-function peripheral 102 when the wireless communication is started.

In addition, a transition to the transmission screen from the menu screen of the multi-function peripheral 102 automatically changes in accordance with an operation of a button from a menu or an operation by NFC, as shown in FIG. 14. With this, a user can perform a transmission operation by simply confirming the transmission screen and then pressing a start button. With this, it is possible to enhance operability by simplifying an operation for a transmission setting by a user.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-081233, filed Apr. 10, 2015, which is hereby incorporated by reference herein in its entirety.

What is claimed is:

1. An image processing apparatus comprising:
a display device, wherein the display device being capable of displaying a plurality of types of screens including a first screen for accepting, via a user's operation, a setting of a transmission destination of image data used in a transmission function and a second screen for providing a function different from the transmission function; and
at least one processor that executes instructions stored in a memory to act as:
a reception unit configured to receive destination information indicating the transmission destination to be used in the transmission function from an external apparatus;
a control unit configured to, in accordance with the reception unit receiving the destination information when the second screen is being displayed on the display device, cause the second screen to transition to the first screen and set the destination information received by the reception unit as the transmission destination of the image data to be used in the transmission function and then control to display information indicating the transmission destination on the first screen, wherein the second screen provides a different function from accepting the setting of the transmission destination of image data; and
a transmission control unit configured to transmit the image data to the transmission destination in accordance with a predetermined user's operation via the first screen when the display device is displaying the first screen.

2. The image processing apparatus according to claim 1, wherein the at least one processor further acts as:
a determination unit configured to, in a case where the reception unit receives the destination information, determine whether or not the display device is displaying the first screen,
wherein, if it is determined by the determination unit that the display device is not displaying the first screen, the control unit causes the second screen displayed on the display device to transition to the first screen, and sets the destination information received by the reception unit as the transmission destination of the image data to be used in the transmission function and then controls to display the information indicating the set transmission destination on the first screen, and
if it is determined by the determination unit that the display device is displaying the first screen, the control unit, sets the destination information received by the reception unit as the transmission destination of the image data to be used in the transmission function and then controls to cause the display device to display the information indicating the set transmission destination on the first screen.

3. The image processing apparatus according to claim 1, wherein the reception unit further receives subject information to be used in the transmission function and body information to be used in the transmission function in addition to the destination information, and the control unit sets a subject designated by the subject information and a body designated by the body information as settings to be used in the transmission function, in accordance with the reception unit receiving the subject information and the body information together with the destination information.

4. The image processing apparatus according to claim 1, further comprising a reading device to read an original to generate scanned image data,
wherein image data transmitted by the transmission control unit is the scanned image data, and the transmission control unit transmits an electronic mail to which the scanned image data is attached to the transmission destination, and the first screen displayed by the control unit is further able to accept a reading setting for the reading device to read the original.

5. The image processing apparatus according to claim 4, wherein the reception unit further receives attachment file name information in addition to the destination information, and
wherein the control unit sets a name designated by the attachment file name information to a name of the image data as settings to be used in the transmission function, in accordance with the reception unit receiving the attachment file name information together with the destination information.

6. The image processing apparatus according to claim 1, wherein the reception unit receives the destination information from the external apparatus via a wireless LAN communication.

7. The image processing apparatus according to claim 6, wherein the reception unit establishes a link of the wireless LAN communication with the external apparatus in accordance with establishment of a link of a near field communication with the external apparatus as a trigger, and receives the destination information via the wireless LAN communication in accordance with establishing a link with the wireless LAN communication.

8. The image processing apparatus according to claim 1, wherein the second screen is a predetermined type of screen.

9. The image processing apparatus according to claim 1, wherein the second screen is a selection screen on which a user is operable to select a desired function among a plurality of functions including at least a copy function and a transmission function.

10. The image processing apparatus according to claim 1, wherein the first screen is a setting screen for displaying a candidate of the transmission destination to be used in the transmission function.

11. A method of controlling an image processing apparatus having a display device, wherein the display device being capable of displaying a plurality of types of screens including a first screen for accepting, via a user's operation, a setting of a transmission destination of image data used in a transmission function and a second screen for providing a function different from the transmission function, the method comprising:
receiving destination information indicating the transmission destination to be used in the transmission function from an external apparatus;
in accordance with the destination information being received from the external apparatus when the second screen is being displayed on the display device, causing the second screen to transition to the first screen and setting the received destination information as the transmission destination of the image data to be used in the transmission function and then control to display information indicating the transmission destination on the first screen, wherein the second screen provides a different function from accepting the setting of the transmission destination of image data; and transmitting the image data to the transmission destination in accordance with a predetermined user's operation via the first screen when the display device is displaying the first screen.

12. A non-transitory computer-readable storage medium storing a program for causing a processor to execute steps to control an image processing apparatus having a display device, wherein the display device being capable of displaying a plurality of types of screens including a first screen for accepting, via a user's operation, a setting of a transmission destination of image data used in a transmission function and a second screen for providing a function different from the transmission function, the executed steps comprising:

receiving destination information indicating the transmission destination to be used in the transmission function from an external apparatus;

in accordance with the destination information being received from the external apparatus when the second screen is being displayed on the display device, causing the second screen to transition to the first screen and setting the received destination information as the transmission destination of the image data to be used in the transmission function and then control to display information indicating the transmission destination on the first screen, wherein the second screen provides a different function from a function for accepting the setting of the transmission destination of image data; and transmitting the image data to the transmission destination in accordance with a predetermined user's operation via the first screen when the display device is displaying the first screen.

13. A printing apparatus having a display unit and a transmission function for transmitting image data to a transmission destination set via a transmission setting screen as a first screen, the printing apparatus comprising:

at least one processor that executes instructions stored in a memory to act as:

a display control unit configured to control the display unit to display a selection screen on which a user is operable to select a desired function among a plurality of functions including at least a copy function and a transmission function;

a reception unit configured to receive destination information indicating the transmission destination to be used in the transmission function from an external apparatus;

a control unit configured to, in accordance with the reception unit having received the destination information from the external apparatus, cause a second screen other than the transmitting setting screen displayed on the display unit to transition to the transmission setting screen in which the destination information has been set from the selection screen; and a transmission control unit configured to transmit the image data to the transmission destination in accordance with accepting a predetermined user's operation via the transmission setting screen when the display device is displaying the transmission setting screen, wherein the transmission setting screen is a setting screen for displaying a candidate of the transmission destination to be used in the transmission function and being operable to set the transmission destination to be used in the transmission function.

14. The printing apparatus according to claim 13, wherein the at least one processor further acts as:

a determination unit configured to, in a case where the reception unit receives the destination information, determine whether or not the display unit is displaying the transmission setting screen, wherein, if it is determined by the determination unit that the display unit is not displaying the transmission setting screen, the control unit causes the second screen to transmission to the transmission setting screen and sets the destination information received by the reception unit as the transmission destination of the image data to be used in the transmission function and then controls to display information indicating the set transmission information on the transmission setting screen, and if it is determined by the determination unit that the display unit is displaying the transmission setting screen, the control unit sets the destination information received by the reception unit as the transmission destination of the image data to be used in the transmission function and then controls to display information indicating the set transmission destination on the transmission setting screen displayed by the display device.

15. The printing apparatus according to claim 13, wherein the reception unit further receives subject information to be used in the transmission function and body information to be used in the transmission function in addition to the destination information, and the control unit sets a subject designated by the subject information and a body designated by the body information to be used in the transmission function, in accordance with the reception unit receiving the subject information and the body information together with the destination information.

16. The printing apparatus according to claim 13, further comprising a reading device to read an original to generate a scanned image data, wherein the image data transmitted by the transmission control unit is the scanned image data, and the transmission control unit transmits an electronic mail to which the scanned image data is attached to the transmission destination, and the transmission setting screen, displayed on the display device, by the control unit is further able to accept a reading setting for the reading device to read the original.

17. The printing apparatus according to claim 16, wherein the reception unit further receives attachment file name information in addition to the destination information, and the control unit sets a name of the image data to be used in the transmission function to a name designated by the attachment file name information, in accordance with the reception unit receiving the attachment file name information together with the destination information.

18. The printing apparatus according to claim 13, wherein the reception unit receives the destination information from the external apparatus via a wireless LAN communication.

19. The printing apparatus according to claim 13, wherein the reception unit establishes a link of the wireless LAN communication with the external apparatus in accordance with establishment of a link of a near field communication with the external apparatus as a trigger, and receives the destination information via the wireless LAN communication in accordance with establishing a link with the wireless LAN communication.

20. A method of controlling a printing apparatus having a display unit and a transmission function for transmitting image data to a transmission destination set via a transmission setting screen as a first screen, the method comprising:
- displaying, on the display unit, a selection screen on which a user is operable to select a desired function among a plurality of functions including at least a copy function and a transmission function;
- receiving destination information indicating the transmission destination to be used in the transmission function from an external apparatus; and
- causing a second screen other than the transmitting setting screen displayed on the display unit to transition to the transmission setting screen in which the destination information has been set from the selection screen in accordance with the destination information having been received from the external apparatus; and
- transmitting the image data to the transmission destination in accordance with accepting a predetermined user's operation via the transmission setting screen when the display device is displaying the transmission setting screen,
- wherein the transmission setting screen is a setting screen for displaying a candidate of the transmission destination to be used in the transmission function and being operable to set the transmission destination to be used in the transmission function.

21. A non-transitory computer-readable storage medium storing a program for causing a processor to execute steps to control a printing apparatus having a display unit and a transmission function for transmitting image data to a transmission destination set via a transmission setting screen as a first screen, the executed steps comprising:
- displaying, on the display unit, a selection screen on which a user is operable to select a desired function among a plurality of functions including at least a copy function and a transmission function;
- receiving destination information indicating the transmission destination to be used in the transmission function from an external apparatus; and
- causing a second screen other than the transmitting setting screen displayed on the display unit to transition to the transmission setting screen in which the destination information has been set from the selection screen in accordance with the destination information having been received from the external apparatus; and
- transmitting the image data to the transmission destination in accordance with accepting a predetermined user's operation via the transmission setting screen when the display device is displaying the transmission setting screen,
- wherein the transmission setting screen is a setting screen for displaying a candidate of the transmission destination to be used in the transmission function and being operable to set the transmission destination to be used in the transmission function.

\* \* \* \* \*